United States Patent [19]
Bourekas et al.

[11] Patent Number: 5,517,659
[45] Date of Patent: May 14, 1996

[54] MULTIPLEXED STATUS AND DIAGNOSTIC PINS IN A MICROPROCESSOR WITH ON-CHIP CACHES

[75] Inventors: Philip A. Bourekas, San Jose; Yeshayahu Mor, Cupertino; Scott Revak, Castro Valley; Avigdor Willenz, Campbell, all of Calif.

[73] Assignee: Integrated Device Technology, Inc., Santa Clara, Calif.

[21] Appl. No.: 240,958

[22] Filed: May 11, 1994

Related U.S. Application Data

[63] Continuation of Ser. No. 708,415, May 31, 1991, abandoned.

[51] Int. Cl.[6] ....................................... G06F 15/00
[52] U.S. Cl. .................. 395/800; 395/185.01; 364/232.8; 364/243.41; 364/267
[58] Field of Search ....................... 395/425, 800, 395/375, 575, 185.01; 364/243.41, 267, 232.8

[56] References Cited

U.S. PATENT DOCUMENTS

| | | | |
|---|---|---|---|
| 4,357,656 | 11/1982 | Saltz et al. | 395/425 |
| 4,392,201 | 7/1983 | Brown et al. | 395/425 |
| 4,996,641 | 2/1991 | Talgam et al. | 395/425 |
| 5,029,070 | 7/1991 | McCarthy et al. | 395/425 |
| 5,091,846 | 2/1992 | Sachs et al. | 395/250 |
| 5,125,084 | 6/1992 | Begun et al. | 395/375 |
| 5,206,945 | 4/1993 | Nishimukai et al. | 395/425 |
| 5,226,009 | 7/1993 | Arimoto | 365/189.04 |
| 5,226,133 | 7/1993 | Taylor et al. | 395/400 |
| 5,255,384 | 10/1993 | Sachs et al. | 395/425 |

*Primary Examiner*—Alyssa H. Bowler
*Assistant Examiner*—John Harrity
*Attorney, Agent, or Firm*—Skjerven, Morrill, MacPherson, Franklin and Friel

[57] ABSTRACT

In a microprocessor, two output pins are dedicated to providing information to assist in diagnosing problems relating to internal instruction and data caches or the software executing in the caches. The information on the pins is time-multiplexed. In a first phase, the pins indicate whether the data or instruction cache is accessed and whether a cache miss has occurred. In a second phase, the pins carry signals identifying the address reference which resulted in a cache miss.

8 Claims, 3 Drawing Sheets

|  | Address phase | Data phase |
|---|---|---|
| Diag (0) | Data / Instr. | $A_2$ |
| Diag (1) | Cacheable / Unc. | $A_3$ |

MULTIPLEXED STATUS AND DIAGNOSTIC PINS IN A MICROPROCESSOR WITH ON-CHIP CACHES

This application is a continuation of application Ser. No. 07/708,415, filed May 31, 1991 now abandoned.

FIELD OF THE INVENTION

This invention relates to microprocessors having on-chip caches and in particular to circuitry for monitoring and debugging the operation of such microprocessors.

BACKGROUND OF THE INVENTION

The use of caches with microprocessors is well known. Caches are based on the principle of locality of software, which provides that when a data/instruction element is used by a microprocessor, it and its close neighbors are likely to be used again soon. A cache is a small, high-speed memory which contains the instructions and data which have recently been used by the microprocessor and are therefore most likely to be needed again.

The latest caches are static RAMs which are included on the same chip with the microprocessor. While this provides extremely fast operation, access to the cache is performed internally and is not "visible" on the pins of the chip. This structure therefore makes monitoring or diagnosing problems relating to the cache or to software executing out of the cache impossible unless special features are built into the chip.

In theory, a large number of pins could be dedicated to provide information regarding the operation of the cache. In practice, this solution is not acceptable, however, because cost and space constraints require that the total number of pins on the chip be kept to a minimum. Ideally, sufficient information could be provided on a small number of pins to permit such debugging and monitoring tools as In Circuit Emulators (ICEs) to function with the chip. ICEs can use shadow caches to emulate microprocessors having on-chip caches. A shadow cache is an external static RAM memory designed to act as an exact copy of an on-chip cache, and which can be examined without disrupting the microprocessor. For a shadow cache to operate properly, certain status information needs to be visible at the microprocessor pins.

SUMMARY OF THE INVENTION

In an embodiment of this invention, a small number of pins on a microprocessor are dedicated to providing information concerning the operation of the microprocessor's on-chip cache. The information provided on the pins is time-multiplexed. During a first time frame, the information on the pins indicates whether an instruction or a data cache is being accessed and whether the access is to an uncacheable address or in fact involves a cache miss. During a second time frame, the pins provide information relative to the address that is being accessed when a potential cache "miss" occurs.

This information, supplied on a minimal number of pins, is necessary to enable a diagnostic device such as an ICE to perform monitoring and debugging functions on the chip.

DESCRIPTION OF THE INVENTION

Figure 1:
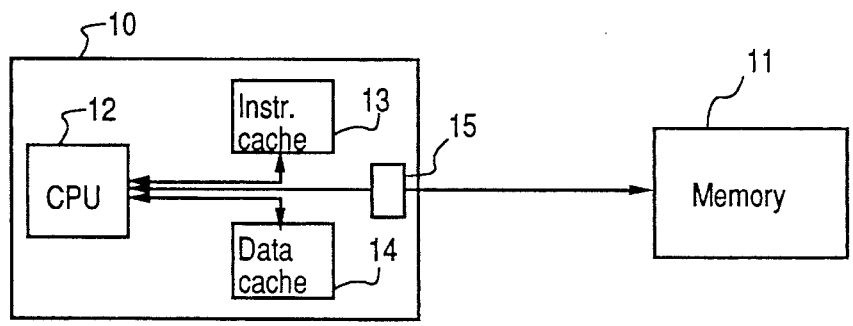
FIG. 1 is a simplified block diagram of a microprocessor and external memory.
Figure 2A:
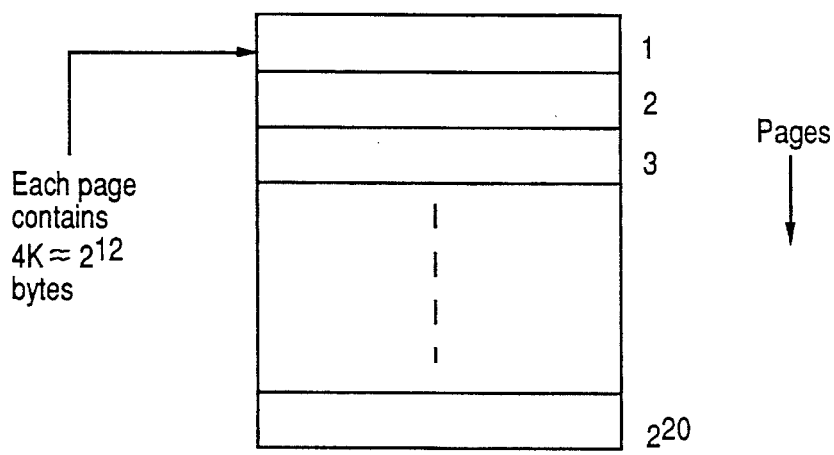
FIG. 2A illustrates the manner in which data is stored in the external memory.
Figure 2B:
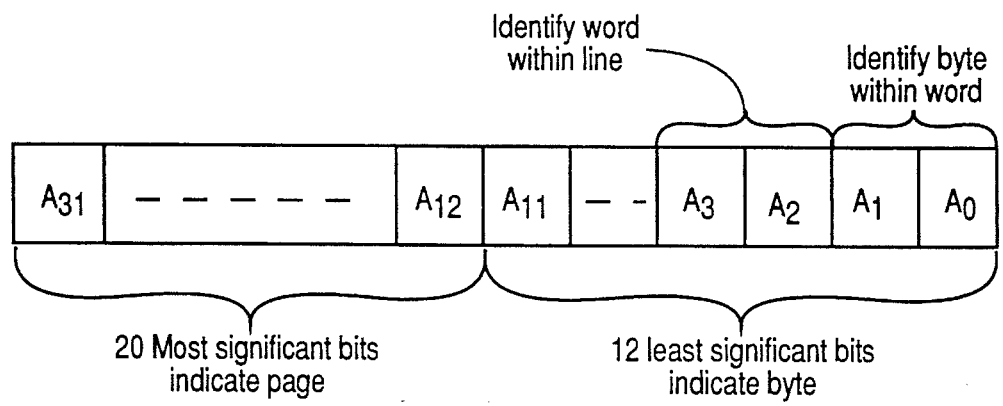
FIG. 2B illustrates the contents of a 32-bit address.
Figure 3:
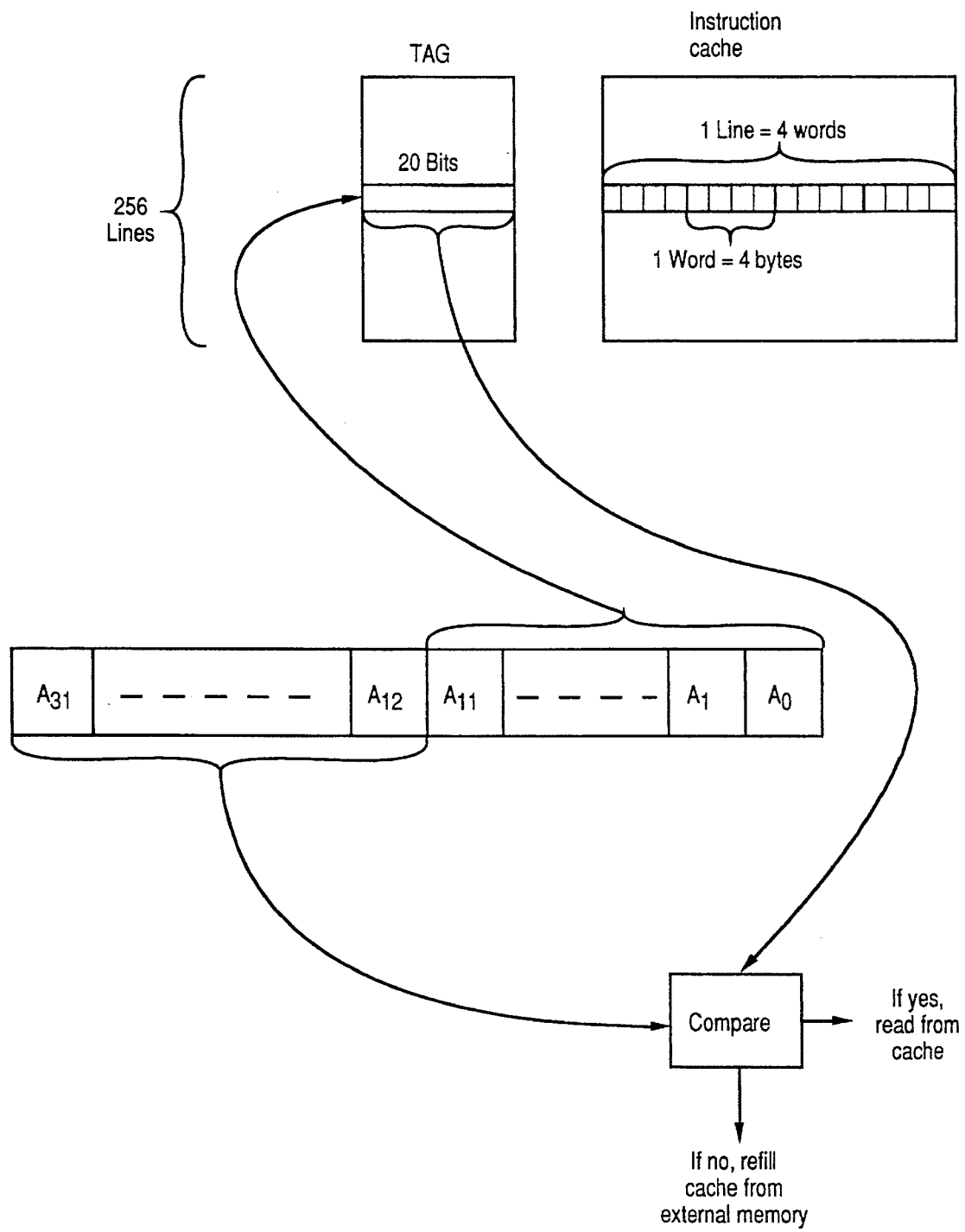
FIG. 3 illustrates the manner in which the instruction cache is accessed.

FIGS. 1–3 illustrate the structure and operation of a microprocessor containing an embodiment of this invention. In FIG. 1, a microprocessor 10 and an external memory 11 are shown. Memory 11 is a standard memory subsystem containing an interface and devices such as DRAMs or EPROMs. As shown in FIG. 1, microprocessor 10 contains a CPU 12, an instruction cache 13 and a data cache 14. CPU 12 first looks for instructions or data in instruction cache 13 or data cache 14, respectively. If the sought after information is not in a cache, CPU 12 then obtains the information from the memory 11 through a bus interface 15. In this embodiment, microprocessor 10 is an IDT79R3051 RISC CPU processor and CPU 12 is a microprocessor core derived from an IDT79R3000A RISC CPU processor, both of which are manufactured by Integrated Device Technology, Inc. of Santa Clara, Calif. The IDT79R3051 and IDT79R3000A are described in the 1991 Databook and the IDT79R3051 Family Hardware User's Manual published by Integrated Device Technology, Inc., copies of which are available at 3236 Scott Boulevard, Santa Clara, Calif. 95054, and both of which are incorporated herein by reference.

FIG. 2A shows the manner in which the data are stored in memory 11. Memory 11 contains up to $2^{20}$ pages, with each page containing 4,096 ($2^{12}$) bytes. Accordingly, a 32-bit address is used to access a particular byte of data in memory 11. FIG. 2B shows the structure of the 32-bit address, with the 20 most significant bits ($A_{12}$-$A_{31}$) indicating the page and the 12 least significant bits ($A_0$-$A_{11}$) indicating the byte within that page.

FIG. 3 illustrates the manner in which instruction cache 13 is accessed by CPU 12. Instruction cache 13 contains 256 lines of data, each line containing 16 bytes, or 4 words. Cache 13 is direct-mapped, that is, each main memory address is mapped to only one particular cache location. Thus, the data in two memory addresses which are mapped to the same cache location cannot be contained in cache 13 at the same time. The 256 lines of information in cache 13 are each represented by a 20-bit tag. When a 32-bit address is presented to cache 13, the 12 least significant bits ($A_0$-$A_{11}$) identify the cache location, and the 20 most significant bits ($A_{12}$-$A_{31}$) identify a tag. Once the cache location is identified by the address, the tag and the instruction at that location are read from cache 13, and the tag is compared with the 20 most significant bits of the address. If the comparison indicates a correspondence, a cache "hit" has occurred, meaning that the instruction sought by the CPU was located in cache 13, and no resort to main memory 11 is required. If there is no match, a cache "miss" occurs, and the address is passed to memory 11, where the data are retrieved and written into cache 13.

As noted, each cache line contains four (32-bit) words. When a cache miss occurs, four words are read from main memory 11, thereby ensuring that a cache line contains 4 adjacent memory locations. Since instructions typically execute sequentially, there is a high probability that the instruction address immediately after the current instruction will be the next instruction. Refilling the cache with those instructions that are near the current instruction results in a higher instruction cache hit rate. A consequence of reading four words at a time from memory 11, however, is that one normally cannot determine which word caused the cache miss. This can make it difficult to monitor the activity of the software in the cache.

The block of four words to be read from memory 11 is identified by address bits ($A_4$-$A_{31}$). Without the structure of the invention, the interface of memory 11 would never see the bits ($A_2$-$A_3$) which are necessary to identify the word which caused the cache miss for monitoring or diagnostic purposes.

Access to data cache 14 is performed in an analogous manner. Data cache 14 contains 512 lines of one 4-byte word each and has an option which allows the user to select either a one-word or four-word refill from memory 11 when a cache miss occurs. If the four-word refill option is selected, it would normally be unclear, externally, which word caused the data cache miss, which resulted in the cache refill.

Essentially, there are three kinds of information that are not available at the memory interface of microprocessor 10 and that would be useful in monitoring or debugging the operation of the on-chip cache:

1. An indication of whether the data were read from the external memory because of a cache miss or because the processor issued an uncacheable reference, i.e., data which is not cached, such as software which directly manipulates or flushes the caches, or which accesses I/O devices.
2. An indication of whether the miss occurred in the instruction cache or the data cache.
3. In the case of a 4-word cache refill, the identity of the particular word which resulted in the miss.

Figures 4, 5:
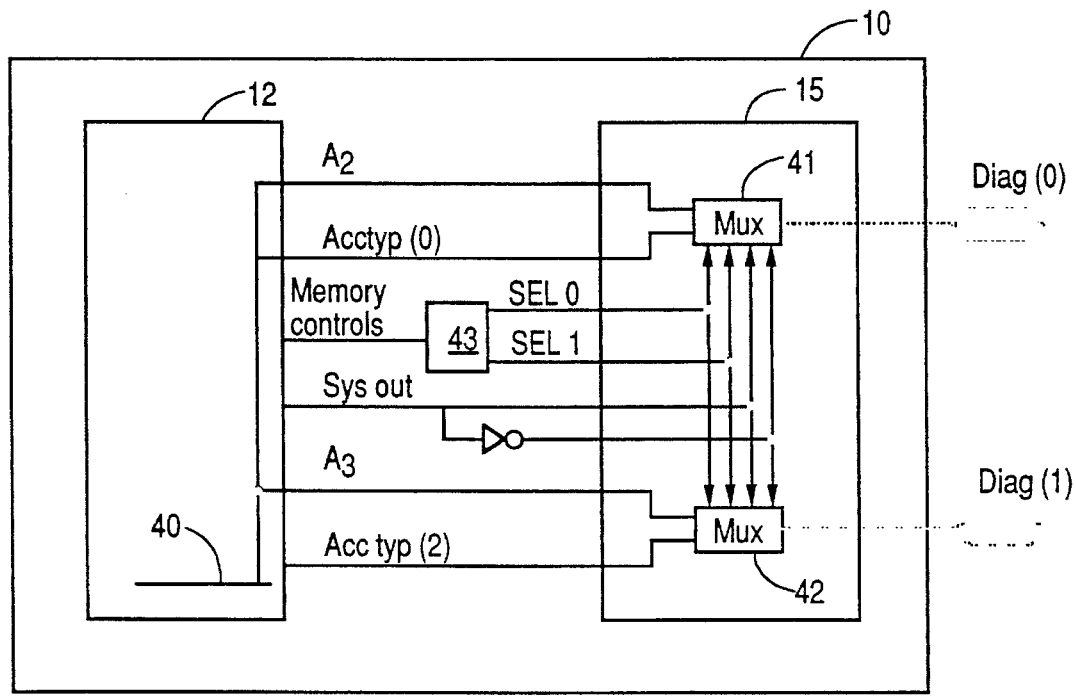
FIG. 4 illustrates an embodiment of the invention.
FIG. 5 illustrates the manner in which information is provided by the embodiment of FIG. 4.

This information is provided by an arrangement of this invention as shown in FIG. 4. FIG. 4 shows a main address bus 40 within CPU 12. The $A_2$ and $A_3$ address bits from address bus 40 are directed to inputs of multiplexers 41 and 42, respectively, each of which has two inputs. The other input of multiplexer 41 is connected to the $AccTyp_0$ signal of CPU 12, and the other input of multiplexer 42 is connected to the $AccTyp_2$ signal of CPU 12. The outputs of multiplexers 41 and 42 are connected to output pins designated Diag(0) and Diag(1), respectively. Multiplexers 41 and 42 are within bus interface 15.

The Access Type signals, AccTyp(2) and AccTyp(0) provide information about the cause of reads of external memory 11. AccTyp(2) indicates whether a memory reference is cacheable or uncacheable, a 0 indicating uncacheable and a 1 indicating cacheable. In the case of a cacheable reference, AccTyp(0) provides a 0 if the reference was to the data cache and a 1 if the reference was to the instruction cache. Microprocessors other than the IDT79R3000A produce signals similar to the access type signals, providing information concerning accesses to memory (or external caches, etc.).

A decoder 43 decodes the memory control signals from CPU 12 and generates select signals (SEL0, SEL1) for multiplexers 41 and 42. The signals SEL0 and SEL1 function in conjunction with a timing signal (SysOut) which determines the bus phase (data phase or address phase). SysOut is a 0 when the bus is in the data phase and a 1 when the bus is in the address phase.

SEL0, SEL1 and SysOut provide complete control of multiplexers 41 and 42, as follows: The $A_2$ and $A_3$ inputs, respectively, are selected when SysOut is a 0, SEL0 is a 1 and SEL1 is a 0. The AccTyp(0) and AccTyp(2) inputs, respectively, are selected when SysOut is a 1, SEL0 is a 0, and SEL1 is a 1.

The information provided on pins Diag(0) and Diag(1) is illustrated in FIG. 5, the information being time-multiplexed between the address phase and the data phase of the read operation. During the address phase, the signal on Diag(0) indicates whether the data or instruction cache is being accessed and the signal on Diag(1) indicates whether the reference is cacheable (indicating a miss) or uncacheable. In the data phase the signals on Diag(0) and Diag(1) reflect the $A_2$ and $A_3$ bits on the address bus, indicating the word which was being sought. The signals on the pins Diag(0) and Diag(1) represent information that is usable by ICEs or other equipment to monitor or debug problems relating to the operation of the instruction cache or data cache within microprocessor 10 or to software executing in these caches. This useful information is obtained according to the invention with a minimal amount of dedicated circuitry and at minimal cost.

The description above is of a single embodiment of this invention and is intended to be illustrative and not limiting. Numerous alternative embodiments will be apparent to those skilled in the art, all of which are within the broad scope of this invention.

We claim:

1. An arrangement for providing information concerning operation of a cache memory in a microprocessor, said arrangement comprising:

a microprocessor formed on a semiconductor chip, said microprocessor containing a central processing unit (CPU) and a cache memory, an output of said CPU being connected to said cache memory; and a main memory external to said chip, an output of said microprocessor being connected to said main memory;

wherein said microprocessor reads a word from said cache memory using an address which contains a first bit which is not contained in an address used by said microprocessor in reading digital information which contains said word from said main memory upon a cache miss;

said arrangement further comprising:

a multiplexer having a first input connected to a first output of said CPU, said first input receiving a signal indicating whether an address accessed by said microprocessor is cacheable or uncacheable, and having a second input connected to a second output of said CPU, said second input receiving said first bit, an output of said multiplexer being connected to a pin of said semiconductor chip;

wherein said cache memory comprises an instruction cache and a data cache, said arrangement further comprising a second multiplexer having a first input connected to a third output of said CPU, said first input of said second multiplexer receiving a signal indicating whether said microprocessor is accessing said instruction cache or said data cache, said second multiplexer further having a second input connected to a fourth output of said CPU, said second input of said second multiplexer receiving a second bit used by said microprocessor in reading said word from said cache memory but not used by said microprocessor in reading said digital information which contains said word from said main memory upon said cache miss, an output of said second multiplexer being connected to a second pin of said semiconductor chip; and wherein a select/control input of each of said first and second multiplexers is connected to a line for holding a first signal during an address phase of a bus in said microprocessor and a second signal during a data phase of said bus in said microprocessor.

2. The arrangement of claim 1 wherein each of said first and second multiplexers is adapted such that said first input thereof is selected when said first signal is present at said select/control input thereof and said second input thereof is selected when said second signal is present at said select/control input thereof.

3. The arrangement of claim 1 wherein said first signal and said second signal occur in a time-multiplexed fashion.

4. An arrangement for providing diagnostic information concerning the operation of a cache memory in a microprocessor, said arrangement comprising:

a microprocessor formed on a semiconductor chip, said microprocessor containing a central processing unit (CPU) and a cache memory, an output of said CPU being connected to said cache memory; and a main memory external to said chip, an output of said microprocessor being connected to said main memory;

wherein said CPU reads a word from said cache memory using an address which contains a first bit which is not contained in an address used by said CPU in reading digital information which contains said word from said main memory upon a cache miss;

said semiconductor chip further comprising:

a multiplexer having a first input connected to a first output of said CPU, said first input receiving a signal indicating whether an address accessed by said microprocessor is cacheable or uncacheable, and having a second input connected to a second output of said CPU, said second input receiving said first bit, an output of said multiplexer being connected to a pin of said semiconductor chip, said pin being for providing said diagnostic information.

5. The arrangement of claim 4 wherein said cache memory comprises an instruction cache and a data cache, said arrangement further comprising a second multiplexer having a first input connected to a third output of said CPU, said first input of said second multiplexer receiving a signal indicating whether said microprocessor is accessing said instruction cache or said data cache, said second multiplexer further having a second input connected to a fourth output of said CPU, said second input of said second multiplexer receiving a second bit used by said microprocessor in reading said word from said cache memory but not used by said microprocessor in reading said digital information which contains said word from said main memory upon said cache miss, an output of said second multiplexer being connected to a second pin of said semiconductor chip.

6. An arrangement for providing diagnostic information about the operation of a cache memory in a microprocessor, said microprocessor being formed on a semiconductor chip and being connected to a main memory external to said chip, a central processing unit (CPU) in said microprocessor accessing a word from said cache memory using an address which contains at least two bits which are not contained in an address used by said CPU to access digital information which contains said word from said main memory upon a cache miss, said semiconductor chip comprising at least two multiplexers, each of said at least two multiplexers having a first input which receives from said CPU certain information concerning the operation of said cache memory and having a second input which receives from said CPU one of said at least two bits, said at least two multiplexers having outputs which are connected, respectively, to at least two pins of said semiconductor chip, said at least two pins being for providing said diagnostic information.

7. The arrangement of claim 6 wherein said at least two bits identify a word sought in a cache memory miss.

8. The arrangement of claim 6 wherein the first input of each of said at least two multiplexers receives access type information from said CPU.

* * * * *